(12) United States Patent
Olson et al.

(10) Patent No.: US 9,435,355 B2
(45) Date of Patent: Sep. 6, 2016

(54) HYDRAULIC LAUNCH ASSIST SYSTEM

(71) Applicant: Eaton Corporation, Cleveland, OH (US)

(72) Inventors: Michael William Olson, Minneapolis, MN (US); Brian Lewis Van Batavia, Delano, MN (US)

(73) Assignee: Eaton Corporation, Cleveland, OH (US)

( * ) Notice: Subject to any disclaimer, the term of this patent is extended or adjusted under 35 U.S.C. 154(b) by 210 days.

(21) Appl. No.: 13/930,924

(22) Filed: Jun. 28, 2013

(65) Prior Publication Data

US 2014/0004998 A1  Jan. 2, 2014

Related U.S. Application Data

(60) Provisional application No. 61/666,349, filed on Jun. 29, 2012.

(51) Int. Cl.
  *F15B 1/02* (2006.01)
  *B60W 20/00* (2016.01)
  (Continued)

(52) U.S. Cl.
  CPC ............... *F15B 1/024* (2013.01); *B60K 6/12* (2013.01); *B60W 10/04* (2013.01); *B60W 10/06* (2013.01); *B60W 10/30* (2013.01); *B60W 20/10* (2013.01); *B60W 30/1886* (2013.01); *B60W 30/18127* (2013.01); *F15B 21/14* (2013.01); *B60W 2510/09* (2013.01); *B60W 2710/09* (2013.01); *B60Y 2200/144* (2013.01); *F15B 2211/20523* (2013.01); *F15B 2211/20538* (2013.01); *F15B 2211/20546* (2013.01); *F15B 2211/20561* (2013.01); *F15B 2211/20569* (2013.01);

(Continued)

(58) Field of Classification Search
None
See application file for complete search history.

(56) References Cited

U.S. PATENT DOCUMENTS 5,579,640 A    12/1996  Gray, Jr. et al.
6,971,463 B2   12/2005  Shore et al.
(Continued)

FOREIGN PATENT DOCUMENTS

DE    10 2007 011 791 A1    9/2008
DE    10 2008 021 889 A1    11/2009
(Continued)

OTHER PUBLICATIONS

International Search Report and Written Opinion for PCT/US2013/048635 mailed Oct. 2, 2013.

*Primary Examiner* — Justin Holmes
(74) *Attorney, Agent, or Firm* — Merchant & Gould P.C.

(57) ABSTRACT

A hybrid hydraulic drivetrain is configured to propel a vehicle and regenerate propulsion energy. The drivetrain includes a prime mover, an accumulator, an axle, a first rotating group, a second rotating group, and a hydraulic transformer. The first rotating group is configured to receive shaft energy from the prime mover, receive shaft energy from the drive axle, send shaft energy to the drive axle, receive hydraulic energy from the hydraulic accumulator, and send hydraulic energy to the accumulator. The second rotating group is configured to receive shaft energy from the prime mover. The hydraulic transformer is configured to charge the accumulator with hydraulic energy received from the second rotating group. The hydraulic transformer may be remotely mounted from the second rotating group. The second rotating group may supply hydraulic energy to an auxiliary circuit of the vehicle. The auxiliary circuit may operate with the prime mover shut down.

17 Claims, 3 Drawing Sheets

(51) Int. Cl.

| | | |
|---|---|---|
| *B60W 10/04* | (2006.01) | |
| *B60K 6/12* | (2006.01) | |
| *B60W 10/06* | (2006.01) | |
| *B60W 10/30* | (2006.01) | |
| *B60W 30/18* | (2012.01) | |
| *B60W 30/188* | (2012.01) | |
| *F15B 21/14* | (2006.01) | |

(52) U.S. Cl.
CPC . *F15B2211/20576* (2013.01); *F15B 2211/212* (2013.01); *F15B 2211/214* (2013.01); *Y02T 10/6208* (2013.01); *Y10T 477/27* (2015.01)

(56) References Cited

U.S. PATENT DOCUMENTS

| | | |
|---|---|---|
| 7,147,078 B2 | 12/2006 | Teslak et al. |
| 7,252,020 B2 | 8/2007 | Gray, Jr. et al. |
| 7,273,122 B2 | 9/2007 | Rose |
| 7,841,432 B2 | 11/2010 | Lynn et al. |
| 8,079,436 B2 | 12/2011 | Tikkanen et al. |
| 8,277,352 B2 | 10/2012 | Ivantysynova et al. |
| 2009/0036248 A1 | 2/2009 | Mueller et al. |
| 2009/0062060 A1 | 3/2009 | Rink |
| 2009/0127011 A1 | 5/2009 | Zhang |
| 2009/0260353 A1 | 10/2009 | Loeffler et al. |
| 2009/0270221 A1 | 10/2009 | Kovach et al. |
| 2009/0283348 A1 | 11/2009 | Ossyra |
| 2010/0186408 A1* | 7/2010 | Rose ............. B60K 6/12 60/629 |
| 2010/0219007 A1* | 9/2010 | Dalum ........... B60W 30/1888 180/65.22 |
| 2012/0173104 A1* | 7/2012 | Zhang ............ B60K 6/12 701/70 |
| 2013/0042602 A1 | 2/2013 | Gauthier |
| 2013/0068056 A1 | 3/2013 | Van Batavia et al. |

FOREIGN PATENT DOCUMENTS

| | | |
|---|---|---|
| EP | 0 975 480 B1 | 2/2004 |
| WO | WO 2008/033378 A1 | 3/2008 |
| WO | WO 2009/020892 A2 | 2/2009 |
| WO | WO 2009/132765 A1 | 11/2009 |
| WO | WO 2011/045519 A1 | 4/2011 |

* cited by examiner

HYDRAULIC LAUNCH ASSIST SYSTEM

CROSS-REFERENCE TO RELATED APPLICATIONS

The present application claims the benefit of U.S. Provisional Application No. 61/666,349, filed Jun. 29, 2012, which is incorporated herein by reference.

TECHNICAL FIELD

The present disclosure relates to hybrid hydraulic systems and methods for capturing, storing, and regenerating energy that would otherwise be wasted by a vehicle. More particularly, the present disclosure is directed to a hydraulic system that uses a hydraulic accumulator or accumulators, fluid flow control devices, hydraulic pumps, hydraulic motors, and/or hydraulic pump-motors to capture, store, and regenerate energy. In addition, the hydraulic system can provide hydraulic power to an auxiliary power system of the vehicle.

BACKGROUND

Hydraulic hybrid vehicles are known in the art that capture kinetic energy and store the kinetic energy in a hydraulic accumulator as potential energy. The potential energy can be released from the hydraulic accumulator and thereby propel the hydraulic hybrid vehicle. Hydraulic hybrid vehicles typically have lower brake wear, higher fuel economy, and may use smaller engines than comparable non-hybrid vehicles.

In certain applications, prior art hydraulic hybrid vehicles may typically not fully charge the hydraulic accumulator during a typical start-stop cycle. In particular, low vehicle speeds and frequent vehicle stops may limit a typical hydraulic accumulator charge after stopping to less than a maximum hydraulic accumulator charge. Take-off performance of the vehicle is typically highest when the hydraulic accumulator is at the maximum hydraulic accumulator charge.

SUMMARY

One aspect of the present disclosure relates to systems and methods for effectively trickle charging a hydraulic accumulator to enhance a charge level of the hydraulic accumulator at a take-off (i.e., launch) of a vehicle. In particular, an engine Power Take Off (PTO) driven pump trickle charges a Hydraulic Launch Assist (HLA) system at relatively low flow rates. A trickle charge system will top off the HLA accumulator to a maximum system pressure to allow for a full State of Charge (SoC) launch at every stop in a desired duty cycle. This allows such HLA systems and methods to be effectively used in duty cycles that have low peak average vehicle speeds and short distances between the typical stops.

Another aspect of the present disclosure relates to a hydraulic drivetrain (e.g., a hybrid hydraulic drivetrain) that is configured to propel a vehicle and regenerate propulsion energy of the vehicle. The hydraulic drivetrain includes a prime mover, a hydraulic accumulator, a drive axle, a first hydraulic rotating group, a second hydraulic rotating group, and a hydraulic transformer. The first hydraulic rotating group is configured to receive shaft energy from the prime mover, is configured to receive shaft energy from the drive axle, is configured to send shaft energy to the drive axle, is configured to receive hydraulic energy from the hydraulic accumulator, and is configured to send hydraulic energy to the hydraulic accumulator. The second hydraulic rotating group is configured to receive shaft energy from the prime mover. The hydraulic transformer is configured to charge the hydraulic accumulator with hydraulic energy received from the second hydraulic rotating group.

In certain embodiments, the hydraulic transformer is remotely mounted from the second hydraulic rotating group. The second hydraulic rotating group may be adapted to supply hydraulic energy to an auxiliary hydraulic circuit of the vehicle. The hydraulic drivetrain may further include a valve, the second hydraulic rotating group may transfer hydraulic energy to the hydraulic transformer when the valve is in a first position, and the second hydraulic rotating group may transfer hydraulic energy to the auxiliary hydraulic circuit when the valve is in a second position. The hydraulic transformer may charge the hydraulic accumulator when the valve is in the first position. The hydraulic transformer may be configured to send hydraulic energy from the hydraulic accumulator to the auxiliary hydraulic circuit of the vehicle. The auxiliary hydraulic circuit of the vehicle may be configured to operate with the prime mover shut down.

Still another aspect of the present disclosure relates to a hydraulic drivetrain (e.g., a hybrid hydraulic drivetrain) that is configured to propel a vehicle and regenerate propulsion energy of the vehicle. The hydraulic drivetrain includes a propel hydraulic circuit and an auxiliary hydraulic circuit. The propel hydraulic circuit includes a hydraulic accumulator, a propel pump-motor, and a pump. The propel pump-motor is configured to exchange hydraulic energy with the hydraulic accumulator and thereby accelerate and decelerate the vehicle. The pump is configured to charge the hydraulic accumulator. The auxiliary hydraulic circuit includes an auxiliary rotating group that is rotationally coupled to the pump. The auxiliary hydraulic circuit supplies hydraulic energy to auxiliary components of the vehicle.

In certain embodiments, the auxiliary rotating group is an auxiliary pump, the pump is a pump-motor that is configured to receive hydraulic energy from the hydraulic accumulator and thereby provide shaft power to the auxiliary pump, and the auxiliary pump is configured to supply hydraulic energy to the auxiliary hydraulic circuit. The auxiliary pump may receive shaft power from a prime mover of the vehicle and thereby supply hydraulic energy to the auxiliary hydraulic circuit.

In certain embodiments, the hydraulic drivetrain may further include an auxiliary pump, the auxiliary rotating group may be an auxiliary motor that is adapted to receive hydraulic energy from the auxiliary pump, and the auxiliary motor may be adapted to provide shaft power to the pump. The pump may supply hydraulic energy to the propel pump-motor and thereby propel the vehicle in a creep mode. The pump may supply hydraulic energy to the hydraulic accumulator and thereby charge the hydraulic accumulator.

Yet another aspect of the present disclosure relates to a hydraulic drivetrain (e.g., a hybrid hydraulic drivetrain) that is configured to convert kinetic energy of a vehicle into stored potential energy and thereby decelerate the vehicle. The hydraulic drivetrain is also configured to release the stored potential energy and thereby accelerate the vehicle. The hydraulic drivetrain includes a prime mover, a hydraulic accumulator, one or more drive wheels, a hydraulic pump-motor, a first hydraulic pump, a second hydraulic pump, a first mode, a second mode, and a third mode. The prime mover is adapted to supply shaft power to the vehicle via an output shaft of the prime mover. The hydraulic accumulator is adapted to receive and supply hydraulic fluid power. The drive wheels are adapted to accelerate and decelerate the vehicle. The drive wheels are coupled to a wheel drive (e.g., a differential). The hydraulic pump-motor includes an input-output shaft. The first hydraulic pump includes an input shaft coupled to the output shaft of the prime mover. The first hydraulic pump is configured to supply hydraulic fluid power to an auxiliary hydraulic circuit of the vehicle. The second hydraulic pump includes an input shaft. When the hydraulic drivetrain is in the first mode, the input-output shaft of the hydraulic pump-motor is rotationally coupled to the wheel drive, hydraulic fluid power is transferred from the hydraulic accumulator to the hydraulic pump-motor, and shaft power is thereby transferred from the input-output shaft of the hydraulic pump-motor to the wheel drive. When the hydraulic drivetrain is in the second mode, the input-output shaft of the hydraulic pump-motor is rotationally coupled to the wheel drive, shaft power is transferred to the input-output shaft of the hydraulic pump-motor from the wheel drive, and hydraulic fluid power is thereby transferred to the hydraulic accumulator from the hydraulic pump-motor. When the hydraulic drivetrain is in the third mode, the second hydraulic pump transfers hydraulic fluid power to the hydraulic accumulator.

In certain embodiments, the input shaft of the first hydraulic pump is coupled to the output shaft of the prime mover by a clutch. The second hydraulic pump may be included in a hydraulic transformer. The hydraulic transformer may include a motor that is rotationally coupled to the second hydraulic pump via the input shaft of the second hydraulic pump, and the first hydraulic pump may transfer hydraulic fluid power to the motor of the hydraulic transformer when the hydraulic drivetrain is in the third mode. The hydraulic transformer may be mounted remotely from the first hydraulic pump. The hydraulic drivetrain may further include a fourth mode in which the output shaft of the prime mover is mechanically rotationally coupled to the wheel drive. The hydraulic drivetrain may further include a hydraulic propel circuit that includes the hydraulic pump-motor, and hydraulic fluid of the auxiliary hydraulic circuit may be isolated from hydraulic fluid of the hydraulic propel circuit. The hydraulic transformer may be a rotary hydraulic transformer. The hydraulic drivetrain may further include a fifth mode in which the hydraulic accumulator transfers hydraulic fluid power to the hydraulic transformer, and the hydraulic transformer transfers hydraulic fluid power to the auxiliary hydraulic circuit. The prime mover may be off in the fifth mode. The hydraulic drivetrain may further include a valve, the hydraulic transformer may include a motor that is rotationally coupled to the second hydraulic pump by the input shaft of the second hydraulic pump, the first hydraulic pump may transfer hydraulic fluid power to the motor of the hydraulic transformer when the valve is in a first position, and the first hydraulic pump may transfer hydraulic fluid power to the auxiliary hydraulic circuit when the valve is in a second position. The valve may be a pilot operated valve that automatically switches to the second position when the hydraulic accumulator reaches a predetermined pressure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
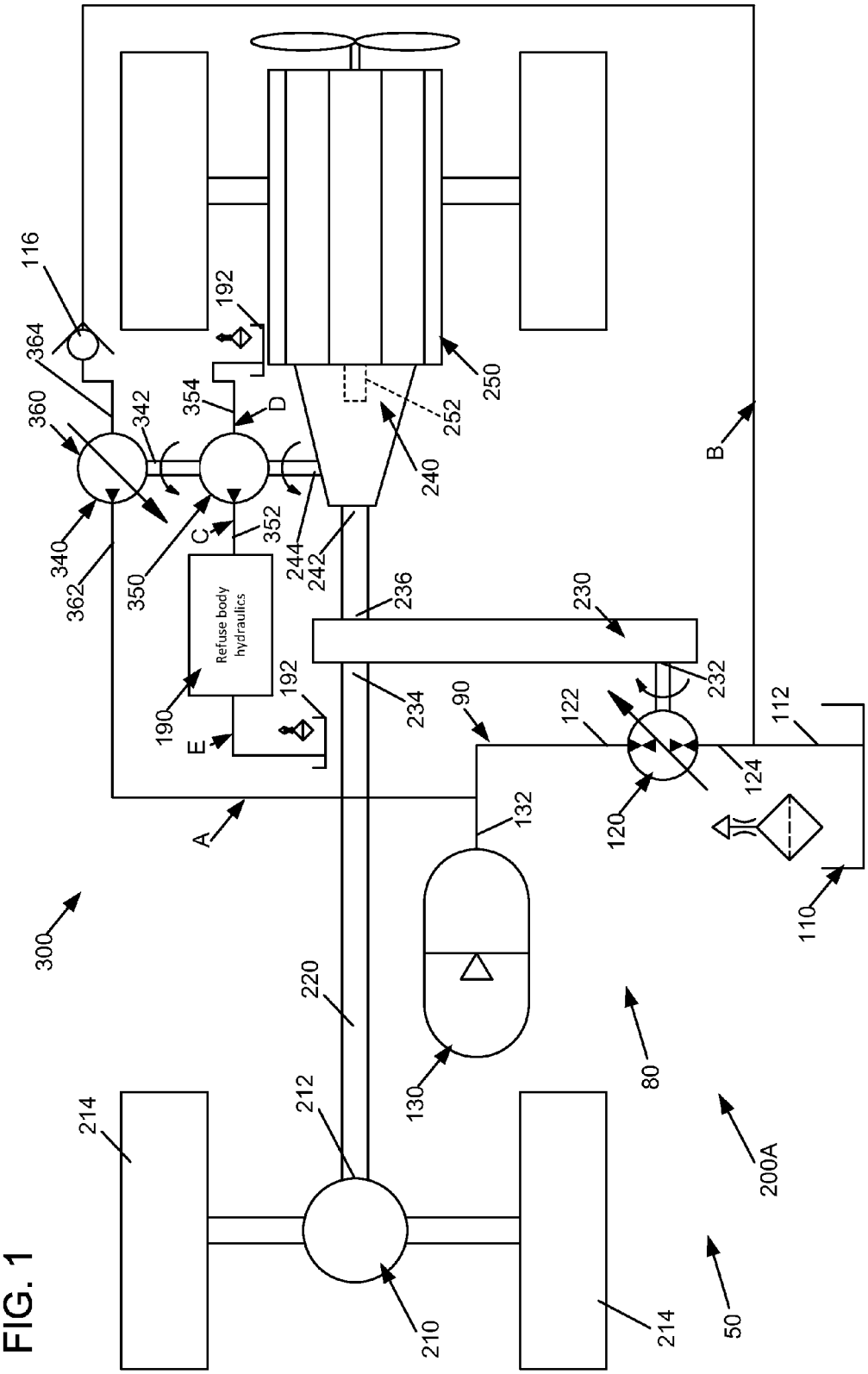
FIG. 1 is a schematic diagram of a first embodiment of a hydraulic system according to the principles of the present disclosure.

Reference will now be made in detail to example embodiments of the present disclosure. The accompanying drawings illustrate examples of the present disclosure. When possible, the same reference numbers will be used throughout the drawings to refer to the same or like parts.

According to the principles of the present disclosure, systems and methods for effectively trickle charging a hydraulic accumulator 130 to enhance a charge level of the hydraulic accumulator 130 at a take-off (i.e., a launch) of a vehicle are provided in various embodiments. In particular, a Power Take Off (PTO) hydraulic pump 150, 360 is driven by an output shaft 252 of a prime mover 250 (e.g., an engine). The hydraulic pump 150, 360 directly or indirectly trickle charges the hydraulic accumulator 130 of a Hydraulic Launch Assist (HLA) system 100, 100', 300 at relatively low flow rates. Ideally, the HLA system 100, 100', 300 will top-off the HLA accumulator 130 to a maximum system pressure to allow for a full State of Charge (SoC) launch at every stop in a desired duty cycle of the HLA system 100, 100', 300. This allows such HLA systems 100, 100', 300 and methods to be effectively used in duty cycles that have low peak average vehicle speeds and short distances between the typical stops. The HLA systems 100, 100', 300 may further be included in a hydraulic hybrid drivetrain 80.

Three example embodiments of the HLA system 100, 100', 300 are illustrated at the figures. Still other embodiments are possible by including combinations of features and/or components illustrated in the drawings and/or described herein. Features and components that are common or similar will generally be described first, followed by various embodiments that differ from each other.

Figure 2:
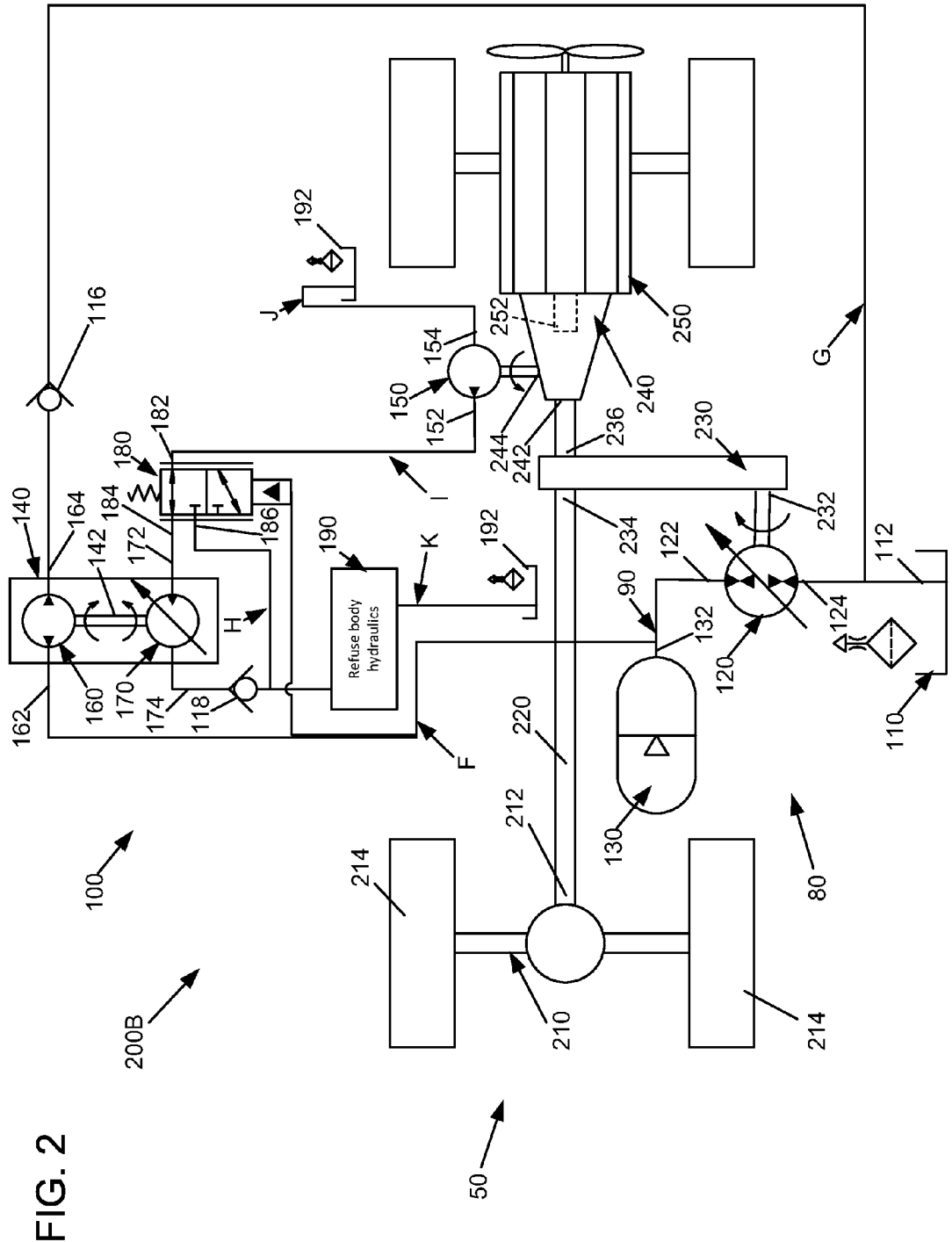
FIG. 2 is a schematic diagram of a second embodiment of a hydraulic system according to the principles of the present disclosure.
Figure 3:
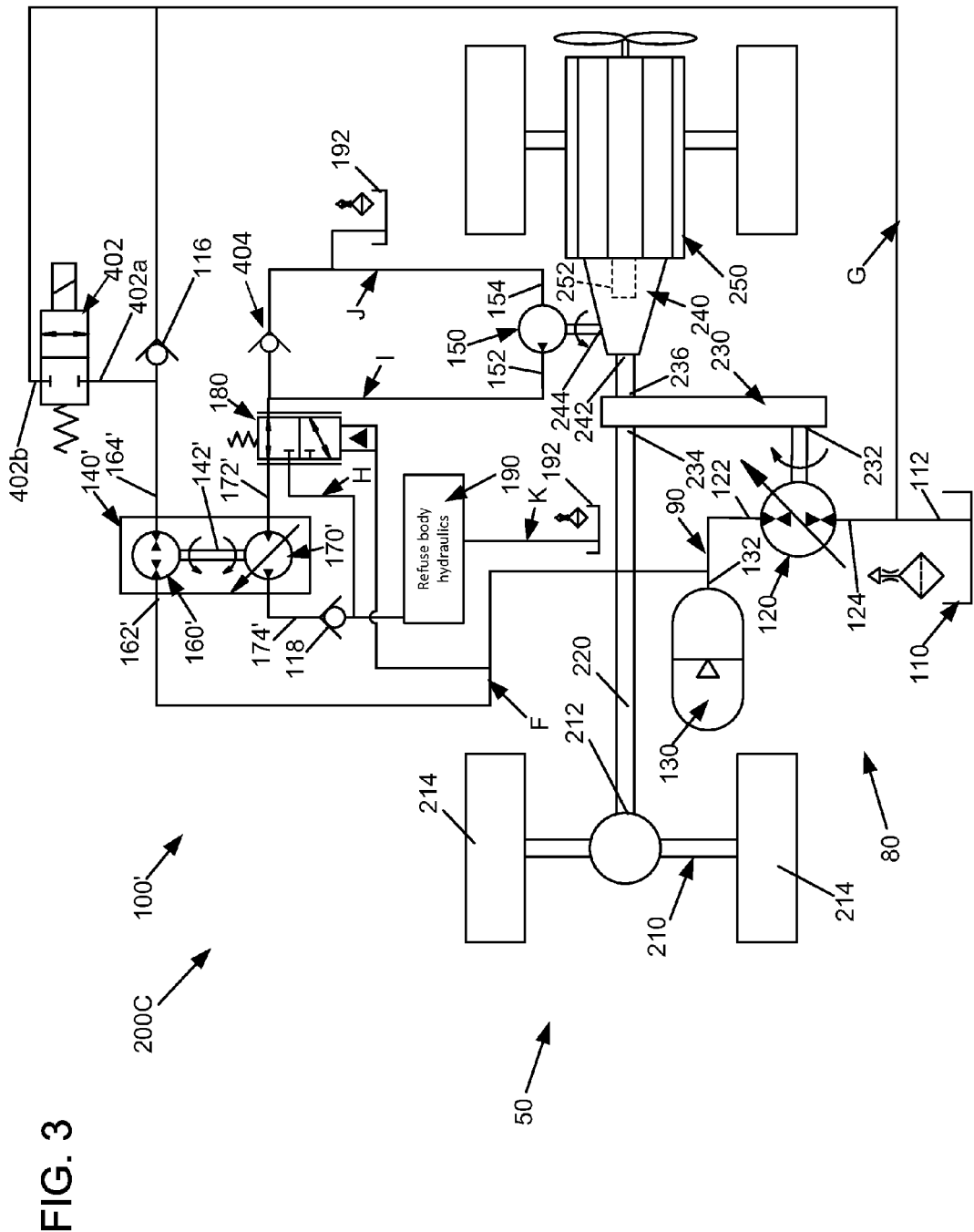
FIG. 3 is a schematic diagram of a third embodiment of a hydraulic system according to the principles of the present disclosure.

As illustrated at FIGS. 1-3, the HLA systems 100, 100', 300 generally pertain to a vehicle 50 and, in particular, to optional drive train arrangements 200A, 200B, 200C of the vehicle 50. Each of the illustrated drive train arrangements 200A, 200B, 200C, include the prime mover 250 with the output shaft 252 housed in a housing 240 (i,e,. a bell housing). The output shaft 252 is rotationally coupled to a drive shaft arrangement 242 that is illustrated with a first segment 236 and a second segment 220. The output shaft 252 may be rotationally coupled to the drive shaft arrangement 242 by a transmission and/or a clutch.

A drive transfer 230 is rotationally coupled to both the first segment 236 and the second segment 220 of the drive shaft arrangement 242. The drive transfer 230 is further rotationally coupled to a pump-motor 120. In certain embodiments, the first segment 236, the second segment 220, and the pump-motor 120 may be continuously coupled to each other. In other embodiments, the first segment 236, the second segment 220, and/or the pump-motor 120 may be coupled to each other by a clutch or clutches. In certain embodiments, the first segment 236, the second segment 220, and/or the pump-motor 120 may be coupled to each other by gear sets, torque converters, transmissions, clutches, etc.

The second segment 220 of the drive shaft arrangement 242 rotationally couples the drive transfer 230 to a drive axle 210. In particular, the second segment 220 is rotationally coupled to a wheel drive 212 of the drive axle 210. As illustrated, the drive axle 210 rotatably mounts a pair of drive wheels 214. The drive axle 210 further rotationally couples the wheel drive 212 to the drive wheels 214. The drive axle 210 may include a differential gear set, a gear reducer, clutches, limited slip devices, brakes, anti-lock brakes, and/or a transmission that are rotationally coupled between and/or to the wheel drive 212 and/or the drive wheels 214. The drive wheels 214 propel the vehicle 50 when turned and further stop the vehicle 50 when stopped from turning. In particular, when the drive wheels 214 are rotationally accelerated, the vehicle 50 accelerates, and when the drive wheels 214 are rotationally decelerated, the vehicle 50 decelerates.

As illustrated at FIGS. 1-3, the vehicle 50 includes a propel circuit 90 that includes the pump-motor 120 with a high pressure inlet/outlet 122 and a low pressure inlet/outlet 124, the hydraulic accumulator 130 with an inlet/outlet 132, a hydraulic tank 110 with an inlet/outlet 112, and a check valve 116.

In the HLA system 300, illustrated at FIG. 1, the propel circuit 90 further includes the pump 360 with an outlet 362 and an inlet 364. The check valve 116 is positioned at the inlet 364 and prevents hydraulic flow from exiting the inlet 364. A hydraulic line A fluidly connects the inlet/outlet 132, the inlet/outlet 122, and the outlet 362. A hydraulic line B fluidly connects the inlet/outlet 124, the inlet/outlet 112, and the check valve 116.

In the HLA system 100, illustrated at FIG. 2, the propel circuit 90 further includes a hydraulic rotating group 160 with an outlet 162 and an inlet 164. The check valve 116 is positioned at the inlet 164 and prevents hydraulic flow from exiting the inlet 164. A hydraulic line F fluidly connects the inlet/outlet 132, the inlet/outlet 122, and the outlet 162. A hydraulic line G fluidly connects the inlet/outlet 124, the inlet/outlet 112, and the check valve 116. As depicted, the hydraulic rotating group 160 is a hydraulic pump.

In the HLA system 100', illustrated at FIG. 3, the propel circuit 90 further includes a hydraulic rotating group 160' with an inlet/outlet 162' and an inlet/outlet 164'. In addition, the propel circuit 90 includes a valve 402 with a first port 402a fluidly connected to the inlet/outlet 164'. The check valve 116 is positioned at the inlet/outlet 164' and prevents hydraulic flow from exiting the inlet/outlet 164' if the valve 402 is closed. The hydraulic line F fluidly connects the inlet/outlet 132, the inlet/outlet 122, and the inlet/outlet 162'. The hydraulic line G fluidly connects the inlet/outlet 124, the inlet/outlet 112, the check valve 116, and a second port 402b of the valve 402. As depicted, the hydraulic rotating group 160' is a hydraulic pump-motor.

As illustrated at FIGS. 1-3, the vehicle 50 further includes an auxiliary circuit 190 that includes a hydraulic tank 192 and various auxiliary components of the vehicle 50. An example vehicle 50 is a refuse collecting and hauling truck (i.e., a garbage truck). The auxiliary circuit 190 of the example vehicle 50 may include hydraulic cylinders, hydraulic motors, hydraulic accumulators, etc. It may be desired to keep the auxiliary circuit 190 fluidly separated from the propel circuit 90. A motivation for this desire may be that higher levels of contamination in the auxiliary circuit 190 are not desired in the propel circuit 90.

In the HLA system 300, illustrated at FIG. 1, the auxiliary circuit 190 further includes the pump 350 with an outlet 352 and an inlet 354. A hydraulic line C fluidly connects the outlet 352 with a high pressure side of the auxiliary circuit 190. A hydraulic line D fluidly connects the inlet 354 and the hydraulic tank 192. A hydraulic line E fluidly connects a low pressure side of the auxiliary circuit 190 and the hydraulic tank 192. An input shaft 342 of the hydraulic pump 360 and an input shaft 244 of the auxiliary hydraulic pump 350 are each rotationally coupled to the output shaft 252 of the prime mover 250. In certain embodiments, the input shafts 244, 342 may be independently clutched to the output shaft 252. In certain embodiments, one or both of the hydraulic pumps 350, 360 may be replaced by a motor and/or a pump-motor and thereby form a hydraulic transformer 340.

In the HLA system 100, illustrated at FIG. 2, the auxiliary circuit 190 further includes the pump 150 with an outlet 152 and an inlet 154; a motor 170 with an inlet 172 and an outlet 174; a selector valve 180 with a first port 182, a second port 184, and a third port 186; and a check valve 118. The check valve 118 is positioned at the outlet 174, between the outlet 174 and a high pressure side of the auxiliary circuit 190, and prevents hydraulic flow from entering the outlet 174. The second port 184 is fluidly connected to the inlet 172. A hydraulic line H fluidly connects the third port 186 with the high pressure side of the auxiliary circuit 190. A hydraulic line I fluidly connects the outlet 152 with the first port 182. A hydraulic line J fluidly connects the inlet 154 and the hydraulic tank 192. A hydraulic line K fluidly connects a low pressure side of the auxiliary circuit 190 and the hydraulic tank 192.

The hydraulic rotating group 160 is rotationally coupled to the motor 170 by a shaft 142. The hydraulic rotating group 160, the motor 170, and the shaft 142 thereby form a hydraulic transformer 140.

As depicted, the selector valve 180 is a pilot operated selector valve that receives a pilot signal from the hydraulic line F. When the hydraulic line F (and therefore the inlet/outlet 132 of the hydraulic accumulator 130) reaches a predetermined pressure, the selector valve 180 connects the first port 182 with the third port 186. When the hydraulic line F (and therefore the inlet/outlet 132 of the hydraulic accumulator 130) falls below the predetermined pressure, the selector valve 180 connects the first port 182 with the second port 184. The selector valve 180 thereby connects the pump 150 with the motor 170 when pressure within the hydraulic accumulator 130 falls below the predetermined level, and the selector valve 180 thereby disconnects the pump 150 from the motor 170 when the pressure within the hydraulic accumulator 130 reaches the predetermined level. The pump 150 thereby automatically indirectly trickle charges the hydraulic accumulator 130.

In the HLA system 100', illustrated at FIG. 3, the auxiliary circuit 190 further includes the pump 150 with the outlet 152 and the inlet 154; a hydraulic rotating group 170' with an inlet 172' and an outlet 174; the selector valve 180 with the first port 182, the second port 184, and the third port 186 (see FIG. 2); and the check valve 118. The check valve 118 is positioned at the outlet 174', between the outlet 174' and the high pressure side of the auxiliary circuit 190, and prevents hydraulic flow from entering the outlet 174'. The second port 184 is fluidly connected to the inlet 172'. The hydraulic line H fluidly connects the third port 186 with the high pressure side of the auxiliary circuit 190. The hydraulic line I fluidly connects the outlet 152 with the first port 182 and a check valve 404. The check valve 404 allows hydraulic flow from the hydraulic tank 192 to the first port 182 but does not allow hydraulic flow to the hydraulic tank 192 from the first port 182. The hydraulic line J fluidly connects the inlet 154, the hydraulic tank 192, and the check valve 404. The hydraulic line K fluidly connects the low pressure side of the auxiliary circuit 190 and the hydraulic tank 192.

The hydraulic rotating group 160' is rotationally coupled to the hydraulic rotating group 170' by a shaft 142'. The hydraulic rotating group 160', the hydraulic rotating group 170', and the shaft 142' thereby form a hydraulic transformer 140'.

As depicted, the selector valve 180 is a pilot operated selector valve that receives a pilot signal from the hydraulic line F. In certain embodiments, the selector valve 180 is controlled by a control system. In certain embodiments, the selector valve 180 is manually controlled. When the hydraulic line F (and therefore the inlet/outlet 132 of the hydraulic accumulator 130) reaches a predetermined pressure, the selector valve 180 connects the first port 182 with the third port 186. When the hydraulic line F (and therefore the inlet/outlet 132 of the hydraulic accumulator 130) falls below the predetermined pressure, the selector valve 180 connects the first port 182 with the second port 184. The selector valve 180 thereby connects the pump 150 with the motor 170' when pressure within the hydraulic accumulator 130 falls below the predetermined level, and the selector valve 180 thereby disconnects the pump 150 from the motor 170' when the pressure within the hydraulic accumulator 130 reaches the predetermined level. The pump 150 thereby automatically indirectly trickle charges the hydraulic accumulator 130.

The hydraulic drivetrain 200A, 200B, 200C may be configured to convert kinetic energy of the vehicle 50 into stored potential energy and decelerate the vehicle 50 when doing so. The hydraulic drivetrain 200A, 200B, 200C may be further configured to release the stored potential energy and accelerate the vehicle 50 when doing so. The hydraulic drivetrain 200A, 200B, 200C may be configured to regenerate propulsion energy of the vehicle 50. The hydraulic pump 150, 350 may include the input shaft 244 that is coupled to the output shaft 252 of the prime mover 250. The hydraulic pump 150, 350 may be configured to supply hydraulic fluid power to the auxiliary hydraulic circuit 190 of the vehicle 50.

The hydraulic drivetrain 200A, 200B, 200C may include a first mode in which the input-output shaft 232 of the hydraulic pump-motor 120 is rotationally coupled to the wheel drive 212. Hydraulic fluid power may be transferred from the hydraulic accumulator 130 to the hydraulic pump-motor 120 in the first mode and thereby shaft power may be transferred from the input-output shaft 232 of the hydraulic pump-motor 120 to the wheel drive 212.

The hydraulic drivetrain 200A, 200B, 200C may include a second mode in which the input-output shaft 232 of the hydraulic pump-motor 120 is rotationally coupled to the wheel drive 212. Shaft power may be transferred to the input-output shaft 232 of the hydraulic pump-motor 120 from the wheel drive 212 in the first mode and thereby hydraulic fluid power may be transferred to the hydraulic accumulator 130 from the hydraulic pump-motor 120.

The hydraulic drivetrain 200A, 200B, 200C may include a third mode in which the hydraulic pump 160, 360 transfers hydraulic fluid power to the hydraulic accumulator 130.

The hydraulic drivetrain 200A, 200B, 200C may include a fourth mode in which the output shaft 252 of the prime mover 250 is mechanically rotationally coupled to the wheel drive 212.

The hydraulic drivetrain 200A, 200B, 200C may include a fifth mode in which the hydraulic accumulator 130 transfers hydraulic fluid power to the hydraulic transformer 140 and the hydraulic transformer 140 transfers hydraulic fluid power to the auxiliary hydraulic circuit 190. The prime mover 250 may be shut off in the fifth mode.

The hydraulic transformer 140, 140' may include the motor 170, 170' that is rotationally coupled to the hydraulic pump 160, 160' via the shaft 142, 142'. The hydraulic pump 150 may transfer hydraulic fluid power to the motor 170, 170' of the hydraulic transformer 140, 140' when the hydraulic drivetrain 200A, 200B, 200C is in the third mode.

The hydraulic transformer 140, 140 may be mounted remotely from the hydraulic pump 150. The hydraulic transformer 140, 140' may include the motor 170 that is rotationally coupled to the hydraulic pump 160, 160' via the input shaft 142. The hydraulic pump 150, 350 may transfer hydraulic fluid power to the motor 170 of the hydraulic transformer 140, 340 when the valve 180 is in a first position, and the first hydraulic pump 150 may transfer hydraulic fluid power to the auxiliary hydraulic circuit 190 when the valve 180 is in a second position.

The hydraulic transformer 140 may be configured to send hydraulic energy from the hydraulic accumulator 130 to the auxiliary hydraulic circuit 190 of the vehicle 50. The auxiliary hydraulic circuit 190 of the vehicle 50 may be configured to operate with the prime mover 250 shut down.

The pump 160, 360 may supply hydraulic energy to the propel pump-motor 120 and thereby propel the vehicle 50 in a creep mode.

Conventional HLA systems may lack performance (e.g., take-off performance, fuel economy, etc.) if driven under adverse conditions (e.g., an anti-lock brake event, the throttle pedal and the brake pedal being depressed simultaneously, etc.) According to the principles of the present disclosure, the trickle charge system will allow fuel savings despite these unfavorable conditions which may prevent the HLA system from recovering significant amounts of kinetic energy.

Remote mounting of the hydraulic transformer 140 overcomes one of the downsides to using an engine PTO driven pump. Chassis interface points may be difficult to interface to because of either a lack of space, different interface arrangements, etc. Interfacing the PTO driven pump 150 to the PTO is simplified by the remote mounting of the hydraulic transformer 140. The hydraulic transformer 140 allows isolation of the HLA fluid (i.e., propel circuit fluid) from the body hydraulic fluid (i.e., auxiliary circuit fluid) while still using the body hydraulic system 190 to drive the trickle charge pump 160, 160'.

An advantage of using the hydraulic transformer 140, 140' is that packaging the system onto the vehicle chassis only requires routing the output of the body hydraulic hoses to the transformer 140, 140' instead of having to interface mechanically to the engine PTO. This allows the trickle charge system to be located in an area of convenient location on the chassis. Another advantage is that with the trickle charge transformer 140, 140', the body hydraulics 190 and/or any hydraulic/pneumatic/rotary device, can also be run off of the stored energy in the HLA accumulator 130. This allows for an engine-off at idle condition for HLA (e.g. in refuse systems) and further increases the fuel economy benefit.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A hydraulic drivetrain adapted to convert kinetic energy of a vehicle into stored potential energy and thereby decelerate the vehicle and further adapted to release the stored potential energy and thereby accelerate the vehicle, the hydraulic drivetrain comprising:
   a prime mover adapted to supply shaft power to the vehicle via an output shaft of the prime mover;
   a hydraulic accumulator adapted to receive and supply hydraulic fluid power;
   at least one drive wheel adapted to accelerate and decelerate the vehicle, the drive wheel coupled to a wheel drive;
   a hydraulic pump-motor including an input-output shaft;
   a first hydraulic pump including an input shaft coupled to the output shaft of the prime mover, the first hydraulic pump adapted to supply hydraulic fluid power to an auxiliary hydraulic circuit of the vehicle;
   a second hydraulic pump including an input shaft; and
   a hydraulic propel circuit that includes the hydraulic pump-motor, wherein hydraulic fluid of the auxiliary hydraulic circuit is isolated from hydraulic fluid of the hydraulic propel circuit;
   a first mode wherein the input-output shaft of the hydraulic pump-motor is rotationally coupled to the wheel drive, wherein hydraulic fluid power is transferred from the hydraulic accumulator to the hydraulic pump-motor, and whereby shaft power is transferred from the input-output shaft of the hydraulic pump-motor to the wheel drive;
   a second mode wherein the input-output shaft of the hydraulic pump-motor is rotationally coupled to the wheel drive, wherein shaft power is transferred to the input-output shaft of the hydraulic pump-motor from the wheel drive, and whereby hydraulic fluid power is transferred to the hydraulic accumulator from the hydraulic pump-motor;
   a third mode wherein the second hydraulic pump transfers hydraulic fluid power to the hydraulic accumulator; and
   a fourth mode wherein the output shaft of the prime mover is mechanically rotationally coupled to the wheel drive.

2. The hydraulic drivetrain of claim 1, wherein the input shaft of the first hydraulic pump is coupled to the output shaft of the prime mover via a clutch.

3. The hydraulic drivetrain of claim 1, wherein the second hydraulic pump is included in a hydraulic transformer.

4. The hydraulic drivetrain of claim 3, wherein the hydraulic transformer includes a motor rotationally coupled to the second hydraulic pump via the input shaft of the second hydraulic pump and wherein the first hydraulic pump transfers hydraulic fluid power to the motor of the hydraulic transformer when the hydraulic drivetrain is in the third mode.

5. The hydraulic drivetrain of claim 3, wherein the hydraulic transformer is mounted remotely from the first hydraulic pump.

6. The hydraulic drivetrain of claim 3, wherein the hydraulic transformer is a rotary hydraulic transformer.

7. The hydraulic drivetrain of claim 3, further comprising a fifth mode wherein the hydraulic accumulator transfers hydraulic fluid power to the hydraulic transformer and the hydraulic transformer transfers hydraulic fluid power to the auxiliary hydraulic circuit.

8. The hydraulic drivetrain of claim 7, wherein the prime mover is off in the fifth mode.

9. The hydraulic drivetrain of claim 3, further comprising a valve, wherein the hydraulic transformer includes a motor rotationally coupled to the second hydraulic pump via the input shaft of the second hydraulic pump, wherein the first hydraulic pump transfers hydraulic fluid power to the motor of the hydraulic transformer when the valve is in a first position, and wherein the first hydraulic pump transfers hydraulic fluid power to the auxiliary hydraulic circuit when the valve is in a second position.

10. The hydraulic drivetrain of claim 9, wherein the valve is a pilot operated valve that automatically switches to the second position when the hydraulic accumulator reaches a predetermined pressure.

11. A hydraulic drivetrain adapted to convert kinetic energy of a vehicle into stored potential energy and thereby decelerate the vehicle and further adapted to release the stored potential energy and thereby accelerate the vehicle, the hydraulic drivetrain comprising:
   a prime mover including an output shaft;
   a hydraulic pump-motor including an input-output shaft;
   a hydraulic accumulator adapted to receive and supply hydraulic fluid power from and to the hydraulic pump-motor via an accumulator circuit;
   an auxiliary pump adapted to supply hydraulic fluid power to an auxiliary circuit of the vehicle, the auxiliary pump including an input shaft mechanically rotationally coupled to the output shaft of the prime mover;
   a drive axle including a wheel drive mechanically rotationally coupled to drive wheels of the vehicle; and
   a drive shaft arrangement including a first segment and a second segment, the first segment selectively mechanically rotationally coupled to the output shaft of the prime mover, the first segment selectively mechanically rotationally coupled to the input-output shaft of the hydraulic pump-motor, the first segment selectively mechanically rotationally coupled to the second segment, the second segment selectively mechanically rotationally coupled to the input-output shaft of the hydraulic pump-motor, and the second segment mechanically rotationally coupled to the wheel drive of the drive axle;
   wherein the auxiliary circuit is fluidly separated from the accumulator circuit;
   wherein the hydraulic drivetrain includes a first configuration that accelerates the vehicle with the hydraulic fluid power from the hydraulic accumulator by mechanically rotationally coupling the hydraulic pump-motor to the second segment of the drive shaft arrangement;
   wherein the hydraulic drivetrain includes a second configuration that decelerates the vehicle by mechanically rotationally coupling the hydraulic pump-motor to the second segment of the drive shaft arrangement thereby suppling the hydraulic fluid power to the hydraulic accumulator; and
   wherein the hydraulic drivetrain includes a third configuration that accelerates the vehicle with the prime mover by mechanically rotationally coupling the first and the second segments of the drive shaft arrangement.

12. The hydraulic drivetrain of claim 11, further comprising an accumulator charge pump adapted to charge the hydraulic accumulator, the accumulator charge pump including an input shaft mechanically rotationally coupled to the output shaft of the prime mover.

13. The hydraulic drivetrain of claim 12, wherein the input shaft of the accumulator charge pump is selectively mechanically rotationally coupled to the output shaft of the prime mover.

14. The hydraulic drivetrain of claim 11, further comprising an accumulator charge pump adapted to charge the hydraulic accumulator, the accumulator charge pump including an input shaft mechanically rotationally coupled to the input shaft of the auxiliary pump and the output shaft of the prime mover.

15. A hydraulic drivetrain adapted to convert kinetic energy of a vehicle into stored potential energy and thereby decelerate the vehicle and further adapted to release the stored potential energy and thereby accelerate the vehicle, the hydraulic drivetrain comprising:
- a prime mover including an output shaft;
- a hydraulic pump-motor including an input-output shaft;
- a hydraulic accumulator adapted to receive and supply hydraulic fluid power from and to the hydraulic pump-motor via an accumulator circuit;
- a hydraulic transformer adapted to charge the hydraulic accumulator, the hydraulic transformer including an input shaft mechanically rotationally coupled to the output shaft of the prime mover, and the hydraulic transformer adapted to supply hydraulic fluid power to an auxiliary circuit of the vehicle;
- a drive axle including a wheel drive mechanically rotationally coupled to drive wheels of the vehicle; and
- a drive shaft arrangement including a first segment and a second segment, the first segment selectively mechanically rotationally coupled to the output shaft of the prime mover, the first segment selectively mechanically rotationally coupled to the input-output shaft of the hydraulic pump-motor, the first segment selectively mechanically rotationally coupled to the second segment, the second segment selectively mechanically rotationally coupled to the input-output shaft of the hydraulic pump-motor, and the second segment mechanically rotationally coupled to the wheel drive of the drive axle;
- wherein the hydraulic drivetrain includes a first configuration that accelerates the vehicle with the hydraulic fluid power from the hydraulic accumulator by mechanically rotationally coupling the hydraulic pump-motor to the second segment of the drive shaft arrangement;
- wherein the hydraulic drivetrain includes a second configuration that decelerates the vehicle by mechanically rotationally coupling the hydraulic pump-motor to the second segment of the drive shaft arrangement thereby suppling the hydraulic fluid power to the hydraulic accumulator; and
- wherein the hydraulic drivetrain includes a third configuration that accelerates the vehicle with the prime mover by mechanically rotationally coupling the first and the second segments of the drive shaft arrangement.

16. The hydraulic drivetrain of claim 15, wherein the hydraulic transformer is further adapted to discharge the hydraulic accumulator and thereby supply the hydraulic fluid power to the auxiliary circuit of the vehicle.

17. The hydraulic drivetrain of claim 11, further comprising a transmission selectively mechanically rotationally coupled to the output shaft of the prime mover thereby selectively mechanically rotationally coupling the output shaft of the prime mover to the first segment of the drive shaft arrangement.

* * * * *